US008897466B2

(12) United States Patent
Ho et al.

(10) Patent No.: US 8,897,466 B2
(45) Date of Patent: Nov. 25, 2014

(54) SYSTEM AND METHOD OF ADJUSTING THE SOUND OF MULTIPLE AUDIO OBJECTS DIRECTED TOWARD AN AUDIO OUTPUT DEVICE

(75) Inventors: Chi Fai Ho, Palo Alto, CA (US); Shin Cheung Simon Chiu, Palo Alto, CA (US)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 13/524,056

(22) Filed: Jun. 15, 2012

(65) Prior Publication Data

US 2012/0250899 A1 Oct. 4, 2012

Related U.S. Application Data

(63) Continuation of application No. 13/483,535, filed on May 30, 2012, now Pat. No. 8,744,067, which is a continuation of application No. 13/115,096, filed on May 24, 2011, now Pat. No. 8,594,319, which is a continuation of application No. 11/213,188, filed on Aug. 25, 2005, now Pat. No. 7,974,422.

(51) Int. Cl.
*H04B 1/00* (2006.01)
*H04H 60/04* (2008.01)

(52) U.S. Cl.
CPC .................................... *H04H 60/04* (2013.01)
USPC ......... 381/119; 381/104; 381/94.1; 455/63.1; 455/293; 704/E21.002

(58) Field of Classification Search
USPC ......... 381/119, 104, 107, 94.1, 94.2, 98, 102, 381/101, 103, 150, 82, 687, 375, 94.7, 370, 381/182, 58; 455/63.1, 293, 280, 269, 401, 455/355, 219, 200.1, 513, 3.06, 414.4, 221, 455/222, 309; 700/94; 379/428.02, 375.01; 704/226, 233, 227, 228, E21.002, 704/E21.014
See application file for complete search history.

(56) References Cited

U.S. PATENT DOCUMENTS 4,149,032 A 4/1979 Peters
5,170,499 A * 12/1992 Grothause .................. 455/238.1

(Continued)

FOREIGN PATENT DOCUMENTS

RS 1332 U 8/2013
WO 03/022003 3/2003

OTHER PUBLICATIONS

Prasad, et al, "A Scalable Artchitecture for VoIP Conferencing", Systemics, Cybernetics and Informatics, V 1-No. 5, p. 7-11.

(Continued)

*Primary Examiner* — Vivian Chin
*Assistant Examiner* — Con P Tran

(57) ABSTRACT

Embodiments of the present invention include methods and apparatuses for adjusting audio content when more multiple audio objects are directed toward a single audio output device. The amplitude, white noise content, and frequencies can be adjusted to enhance overall sound quality or make content of certain audio objects more intelligible. Audio objects are classified by a class category, by which they are can be assigned class specific processing. Audio objects classes can also have a rank. The rank of an audio objects class is used to give priority to or apply specific processing to audio objects in the presence of other audio objects of different classes.

30 Claims, 9 Drawing Sheets

(56) References Cited

U.S. PATENT DOCUMENTS

| | | | | |
|---|---|---|---|---|
| 5,652,800 | A | 7/1997 | Roberts | |
| 5,717,818 | A | 2/1998 | Nejime et al. | |
| 5,890,108 | A | 3/1999 | Yeldener | |
| 5,910,996 | A | 6/1999 | Eggers et al. | |
| 6,028,514 | A * | 2/2000 | Lemelson et al. | 340/539.13 |
| 6,230,130 | B1 | 5/2001 | Castello da Costa | |
| 6,782,106 | B1 * | 8/2004 | Kong et al. | 381/74 |
| 6,978,010 | B1 * | 12/2005 | Short et al. | 379/388.03 |
| 7,180,892 | B1 | 2/2007 | Tackin | |
| 7,180,997 | B2 | 2/2007 | Knappe | |
| 2001/0028634 | A1 | 10/2001 | Huang | |
| 2001/0046304 | A1 * | 11/2001 | Rast | 381/74 |
| 2003/0035551 | A1 * | 2/2003 | Light et al. | 381/71.6 |
| 2003/0112987 | A1 | 6/2003 | Nordqvist | |
| 2004/0066299 | A1 * | 4/2004 | Hanabusa et al. | 340/574 |
| 2004/0138873 | A1 | 7/2004 | Heo | |
| 2004/0152054 | A1 | 8/2004 | Gleissner | |
| 2005/0131683 | A1 | 6/2005 | Covell | |
| 2005/0255817 | A1 * | 11/2005 | Edeler | 455/161.1 |
| 2006/0023900 | A1 | 2/2006 | Erhart | |
| 2006/0182295 | A1 | 8/2006 | Dijkstra | |
| 2006/0247922 | A1 | 11/2006 | Hetherington | |
| 2007/0189544 | A1 * | 8/2007 | Rosenberg | 381/57 |

OTHER PUBLICATIONS

Stanojevic, Tomislav "Surround Sound for a New Generation of Theaters, Sound and Video Contractor" Dec. 20, 1995.

Stanojevic, T. et al "The Total Surround Sound System", 86th AES Convention, Hamburg, Mar. 7-10, 1989.

Stanojevic, T. et al "Designing of TSS Halls" 13th International Congress on Acoustics, Yugoslavia, 1989.

Stanojevic, T. et al "TSS System and Live Performance Sound" 88th AES Convention, Montreux, Mar. 13-16, 1990.

Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.

Stanojevic, T. et al "The Total Surround Sound (TSS) Processor" SMPTE Journal, Nov. 1994.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana Abstract.

* cited by examiner

SYSTEM AND METHOD OF ADJUSTING THE SOUND OF MULTIPLE AUDIO OBJECTS DIRECTED TOWARD AN AUDIO OUTPUT DEVICE

CROSS-REFERENCE TO RELATED APPLICATIONS

The present application is a continuation of co-pending U.S. patent application entitled, "System and Method of Adjusting the Sound of Multiple Audio Objects Directed Toward an Audio Output Device", Ser. No. 13/483,535, which is an continuation application of U.S. Ser. No. 13/115,096 filed on May 24, 2011, which is an continuation application of U.S. Pat. No. 7,974,422 issued on Jul. 5, 2011, hereby incorporated by reference in its entirety

BACKGROUND OF THE INVENTION

1. Field

This invention relates generally to audio data, more specifically, to a system and method of enhancing the listening experience in the presence of multiple audio data directed toward a single audio output device.

2. Related Art

The telephone has been used for person-to-person communications since its inception. New usages emerged in the early 1970's in which users could use the telephone to communicate with machines and automated systems to obtain information such as the time of day, or location and business hours of a merchant. Other more sophisticated usages include call center applications, particularly those empowered by Interactive Voice Response (IVR) technologies. Such applications ranges from auto-attendant, pin code authentication, merchandise ordering, ticket reservation, to complex class registration and financial transactions.

However, due to the sequential nature of conversational communications, using a phone call to navigate large amounts of information and perform complex transactions is inefficient, awkward, and often error prone.

Integration of data communication into telephone usage helps to improve efficiency and to reduce complexity of information presented to a user. Such integration, nevertheless, presents a new challenge. Multiple audio data sources targeting the phone's audio output device may render the overall audio signals unintelligible. For example, audio data playing loud background music may drown out a phone conversation. In another example, the total amplitude of the multiple audio data may exceed the listening tolerance level of a user.

The foregoing illustrates a need to enhance the listening experience for a user when there are multiple audio data directed toward a single audio output device.

BRIEF SUMMARY OF THE INVENTION

Embodiments of the present invention include methods and techniques of adjusting the sound of multiple audio objects directed toward a single audio output device and combining them into a single output to enhance the intelligibility and performance of such an audio output device.

In one embodiment, the amplitudes of multiple audio objects are adjusted according to the class of the audio objects. The manner and priority in which a given audio object is handled is related directly to the class type of that audio object.

In one embodiment, the amplitudes of multiple audio objects are adjusted based on the ranking of the class of an audio object relative to the rank of the class of other audio objects present. In such an embodiment, higher ranked audio objects are given priority or handled in such a way as to make the higher ranked audio objects more salient or more intelligible than lower ranked audio objects.

Additional embodiments will be evident from the following detailed description and accompanying drawings, which provide a better understanding of the nature and advantages of the present invention.

System and computer program products corresponding to the above-summarized methods are also described and claimed herein.

DETAILED DESCRIPTION OF THE INVENTION

Audio Object

Figure 1:
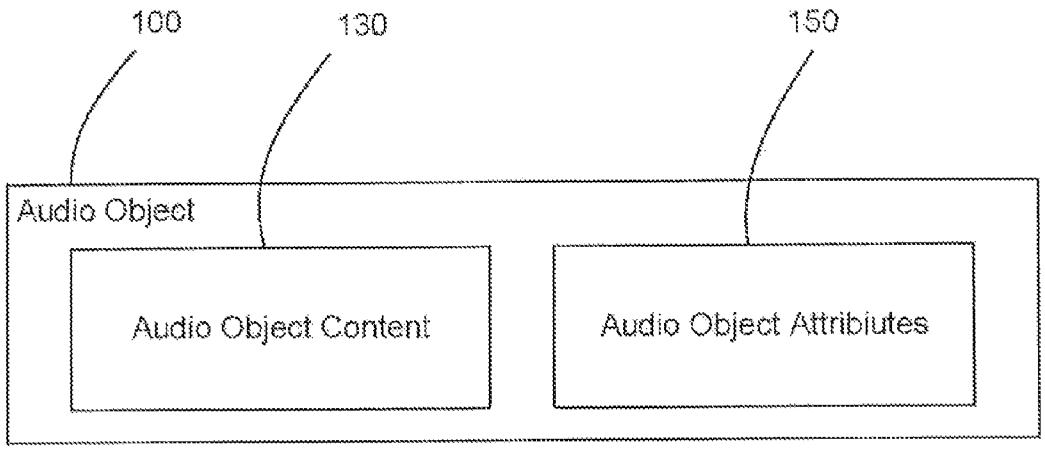
FIG. 1 illustrates a block diagram of an audio object.

FIG. 1 is a block diagram illustrating an audio object. An audio object 100 includes, but is not limited to; audio object content 130 and audio object attributes 150.

Audio object content 130 contains audio data. In one embodiment, the audio data is in uncompressed A-Law Pulse Code Modulation (PCM) format. In one embodiment, the audio data is in uncompressed u-Law Pulse Code Modulation (PCM) format. In one embodiment, the audio data is in G.711 speech codec format. In another embodiment, the audio data is in G723.1 speech codec format. In another embodiment, the audio data is in Musical Instrument Digital Interface (MIDI) format. In another embodiment, the audio data is in GSM 6.01 speech codec format. In yet another embodiment, the audio data is in MP3 (MPEG1, Audio Layer 3) format.

Audio object attributes 150 include information about audio object content 130. In one embodiment, audio object attributes 150 include an audio object class. Audio object classes describe an attribute, class or type of audio data stored in audio object content 130. In one embodiment, audio object class is set to one of the following including, but not limited to, announcement class, conversation class or other class. The classification of audio object 100 is stored in audio object attributes 150. For example, an audio object classified as conversation class, a value for indicating "conversation class" is stored in audio object attributes 150. Similarly, for an audio object classified as other class, a value indicating "other class" is stored in audio object attributes 150. As used herein, any audio object that is said to be "classified as" some attribute means that that particular audio object has a value stored in its audio object attributes that indicates that attribute.

In one embodiment, an audio object 100 has audio object class set to announcement class; the audio object content 130 contains audio data of an announcement, such as an emergency or public safety announcement. In another embodiment, an audio object 100 has audio object class set to conversation class; the audio object content 130 contains audio data of a conversion. In yet another embodiment, an audio object 100 has audio object class set to other class; the audio object content 130 contains other audio data.

In one embodiment, audio object content 130 derives audio object attributes 150. In one embodiment, an audio object content 130 contains a frequency pattern of a conversation or a speech, the derived audio object attributes 150 includes an audio object class set to conversation class. In another embodiment, an audio object content 130 contains a frequency pattern of a song or a piece of music, the derived audio object attributes 150 includes an audio object class set to music class.

Audio Output Mixer

Figure 2:
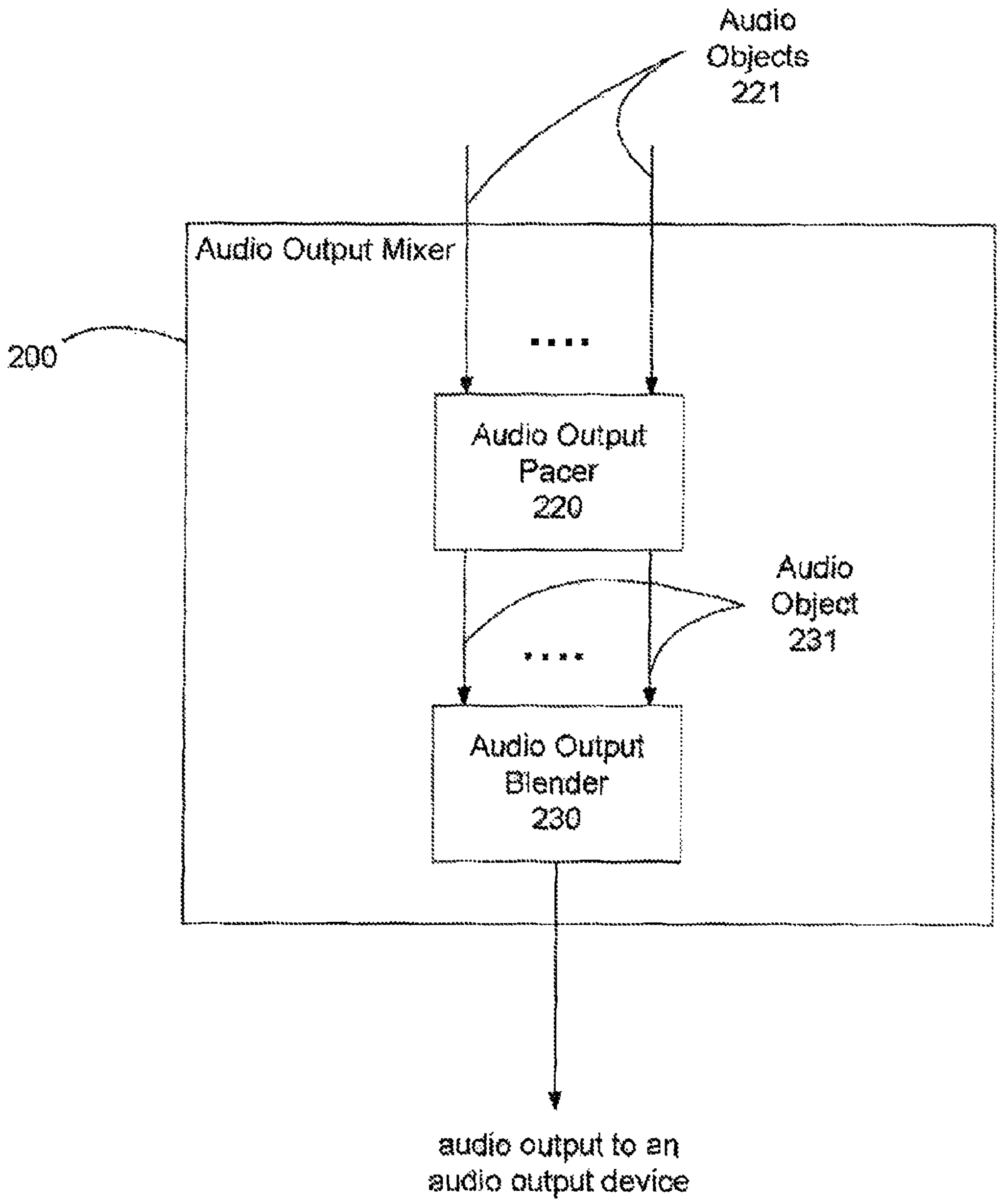
FIG. 2 illustrates a block diagram of an audio output mixer.

FIG. 2 is a block diagram illustrating an audio output mixer. Audio output mixer 200 includes, but is not limited to, an audio output pacer 220 and an audio output blender 230. Audio output pacer 220 connects to audio output blender 230. Audio output blender 230 connects to an audio output device. As used herein, audio output device is any device that bridges the data coming from the audio output blender to a user. Such devices include, but are not limited to, telephones, telephone handsets, headphones, headsets, personal media players, home media players, and speakers. Audio output mixer 200 can receive a plurality of audio objects 221. Audio output pacer 220 processes the plurality of audio objects 221 in order to conform to the hearing constraints for a person. Audio output pacer 220 can adjust sound levels, frequency ranges and audio speed. Audio output pacer 220 modifies up to all audio objects 221, and sends up to all processed audio objects 221 as audio objects 231 to audio output blender 230.

Audio output blender 230 combines audio objects 231 into a single audio output in order to enhance the overall listening comfort. Audio output blender 230 sends a single audio output to an audio output device.

In one embodiment, the functionalities of audio output mixer are implemented in software. In another embodiment, the functionalities of audio output mixer are implemented in a Digital Signal Processor (DSP) or Application Specific Integrated Circuit (ASIC).

Audio Output Pacer

Processing an Audio Object Based on Class

Figure 3:
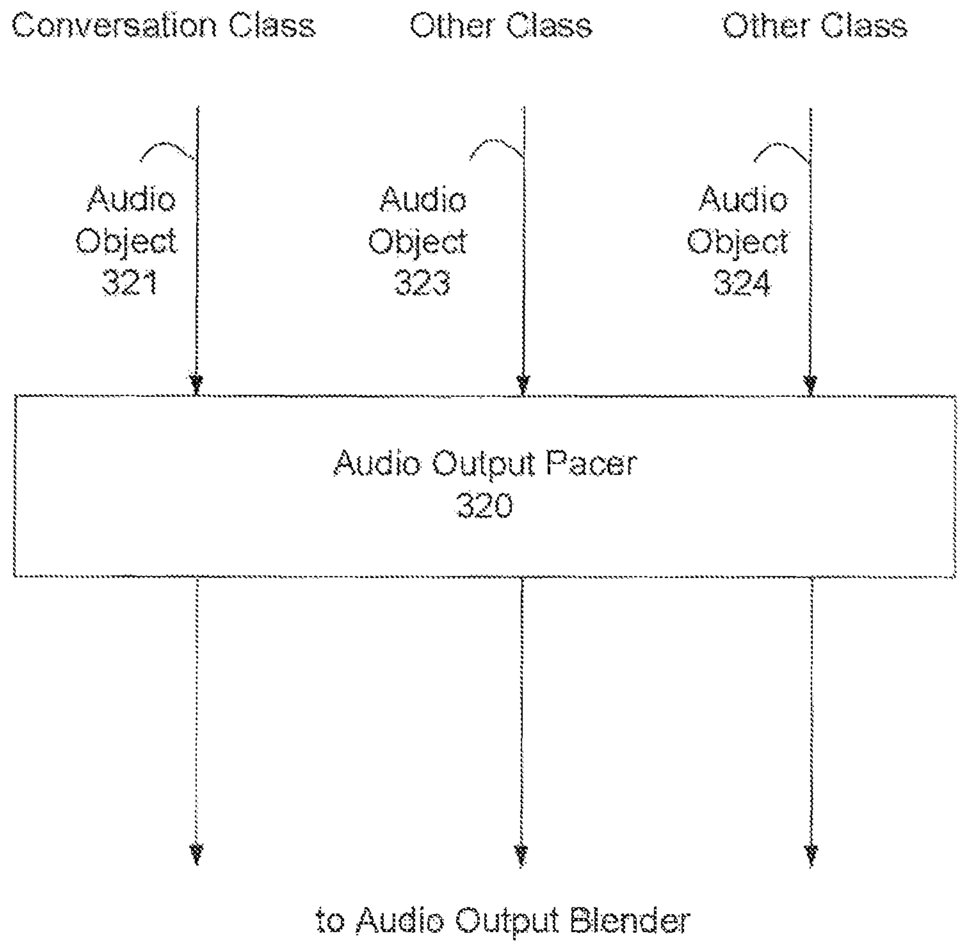
FIG. 3 illustrates a block diagram of a system for adjusting the sound of audio objects based on audio object class.

FIG. 3 illustrates a block diagram of a process performed on audio objects based on audio object class. Audio output pacer 320 processes a plurality of audio objects received by the audio output mixer, giving priority to the audio object classified as conversation class so as to ensure the conversation remains intelligible in the presence of other audio objects. In one embodiment, audio output pacer 320 modifies the audio object with conversation class to an optimal sound level, and renders audio objects of other class at a background sound level.

Audio object 321 is classified as conversation class. In one embodiment, audio output pacer 320 maintains the amplitude of the audio object content in audio object 321 to no lower than 65 dB. In another embodiment, audio output pacer 320 applies echo cancellation to audio object content. In yet another embodiment, audio output pacer 320 applies white noise reduction to audio object content.

Audio object 323 and an audio object 324 are both classified as other class. In one embodiment, audio output pacer 320 attenuates the amplitude of the audio object content in audio object 323 and audio object 324 to no higher than 35 dB each. In another embodiment, audio output pacer 320 attenuates the amplitude of the audio object content in audio object 323 and audio object 324 so that their amplitudes are no higher than the amplitude of the audio object 321 classified as conversation class.

Processing Audio Objects Based on Other Audio Object

Figure 4:
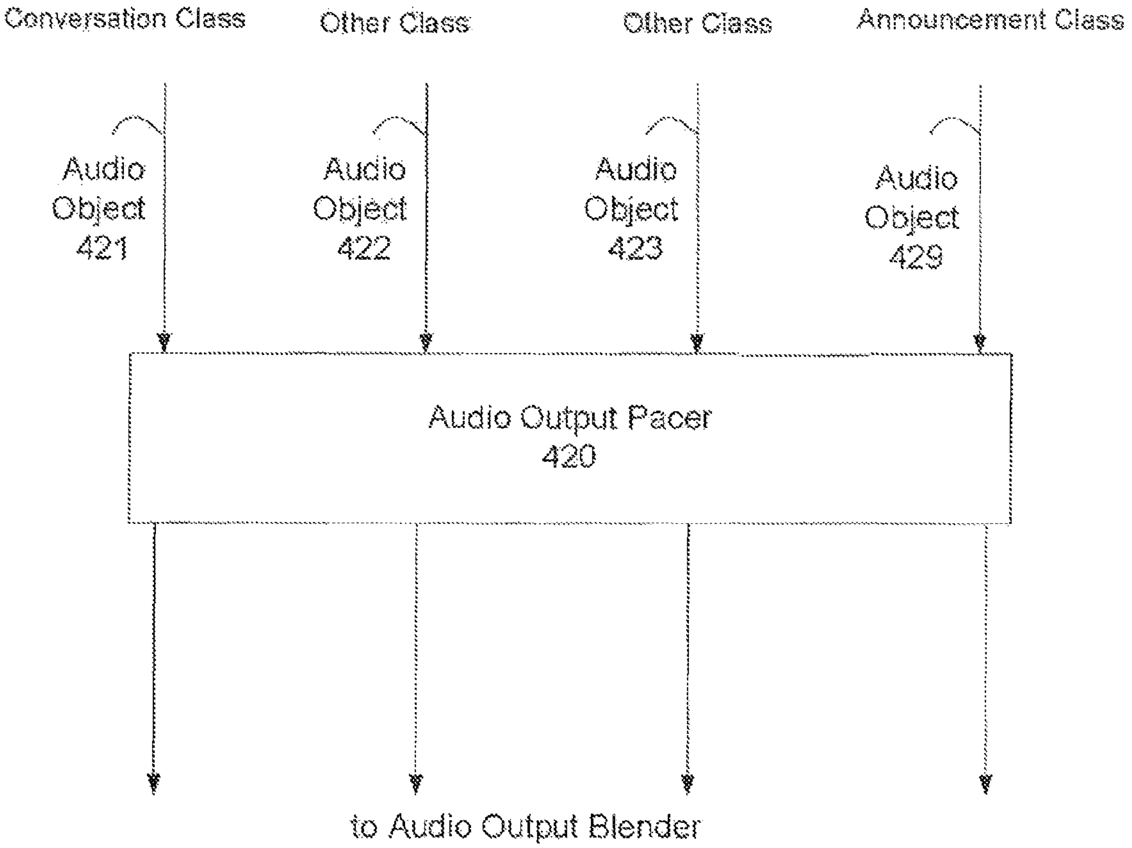
FIG. 4 illustrates a block diagram of a system for adjusting the sound of audio objects based on other audio objects.

FIG. 4 illustrates a block diagram of a process performed on audio objects based on other audio objects.

Audio output pacer 420 processes a plurality of audio objects in the presence of one or more other audio objects classified as announcement class so that the announcement contained in the audio object classified as announcement class is not interrupted or caused interference by other audio objects.

Audio object 421 is classified as conversation class; audio object 422 is classified as other class; audio object 423 is classified as other class; audio object 429 is classified as announcement class. In one embodiment, audio output pacer 420 attenuates the amplitude of the audio object content in audio object 421 to 0 dB, and suspends the processing of audio object 422 and audio object 423. In one embodiment, when audio output pacer 420 finishes processing audio object 429, audio output pacer 420 restores the amplitude of the audio object content in audio object 421 to the original level, and resumes processing of audio object 422 and audio object 423.

In yet another embodiment, audio output pacer 420 attenuates the amplitude of the audio object content in audio object 423 and audio object 424 so that their amplitudes are no higher than the amplitude of audio objects of higher ranked class. In such an embodiment, a ranking of classes is compiled and stored or programmed into audio output pacer 420 so that rank of any given class of audio object relative to other audio objects can easily and quickly be determined by audio output pacer. In one embodiment audio output pacer 420 includes a memory. In another embodiment, audio output pacer 420 can access an external memory to retrieve the ranking of any given audio object. For example, in the foregoing embodiment, announcement class is ranked higher than conversation class and other class. The following is an example of a possible class ranking according to one embodiment of the present invention.

| Rank | Class |
|---|---|
| 4 | Announcement |
| 3 | Conversation |
| 2 | Music |
| 1 | Other |

In the example above, announcement class is ranked higher than every other class, and would be processed accordingly. However, in a scenario in which there is no audio object classified as announcement class, then an audio object classified as conversation class would take priority over all other audio objects present.

Audio Output Blender

Processing Audio Objects from Audio Output Pacer

Figure 5:
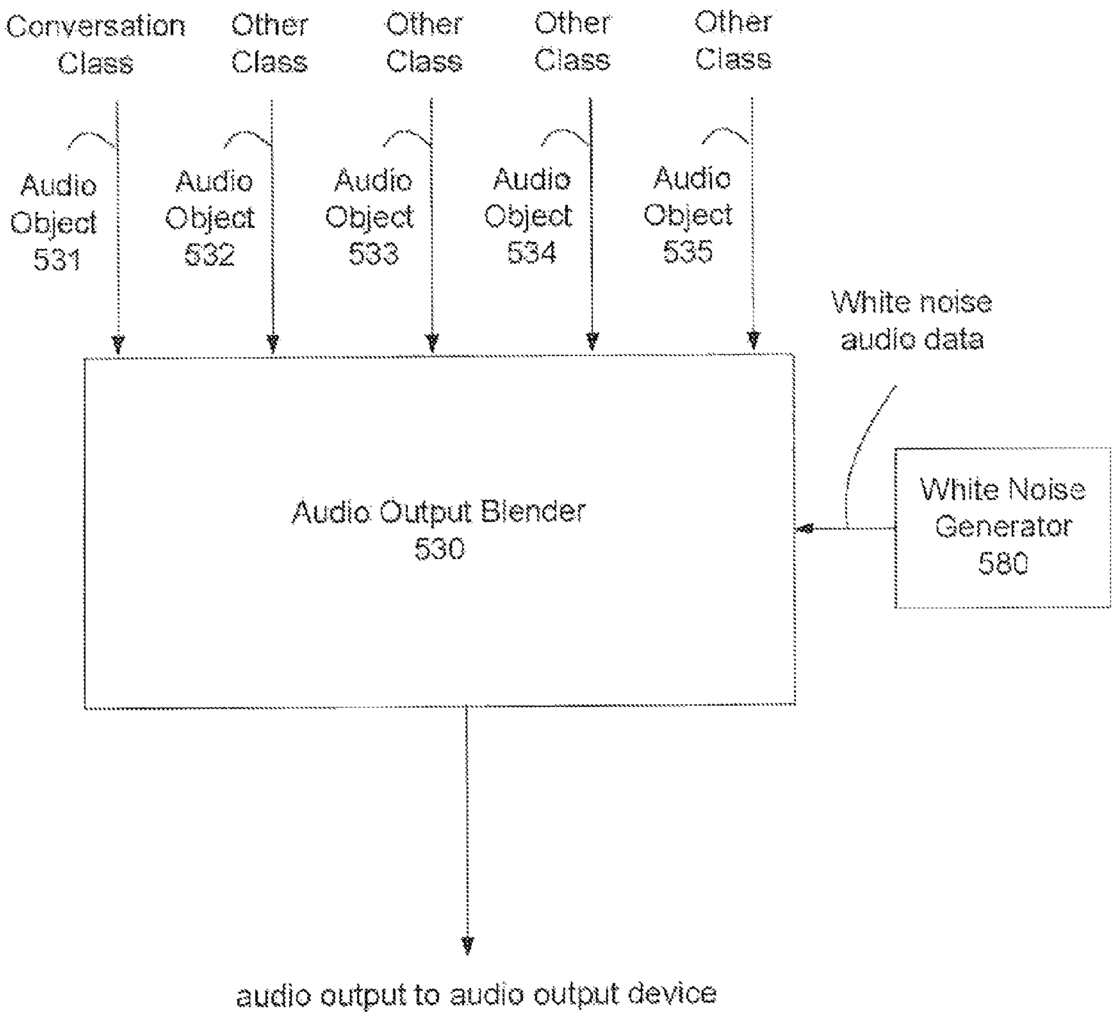
FIG. 5 illustrates a block diagram of a system for combining the sound of multiple audio objects into one audio output.

FIG. 5 illustrates a block diagram of a process to combine a plurality of audio objects into one audio output.

Audio output blender 530 receives a plurality of audio objects from audio output pacer. Audio object 531 is classified as conversation class whereas audio object 532, audio object 533, audio object 534 and audio object 535 are all classified as other class. Audio output blender 530 normalizes the amplitude of the audio object content of each audio object, such that the total amplitude of the combined audio output stays at a comfortable level. In one embodiment, the comfortable level is at 65 dB. In another embodiment, the comfortable level is at 80 dB In one embodiment, audio output blender 530 allocates 80% of the total amplitude to the audio object classified as conversation class, and 20% to all audio object classified as other class. Audio output blender 530 further divides the 20% amplitude allotment among all the audio objects classified as other class. In such an embodiment, audio output blender 530 allocates 5% each to audio object 532, audio object 533, audio object 534 and audio object 535. Audio output blender 530 adjusts the amplitude of the audio object content in audio object 531, audio object 532, audio object 533, audio object 534 and audio object 535 accordingly.

In one embodiment, audio output blender 530 includes a white noise generator 580. In one embodiment, audio output blender 530 instructs white noise generator 580 to generate white noise audio data at 20 dB. Audio output blender 530 combines the processed audio object 531, audio object 532, audio object 533, audio object 534, audio object 535, and the white noise audio data into a single audio output and sends the audio output to the audio output device.

Figure 6:
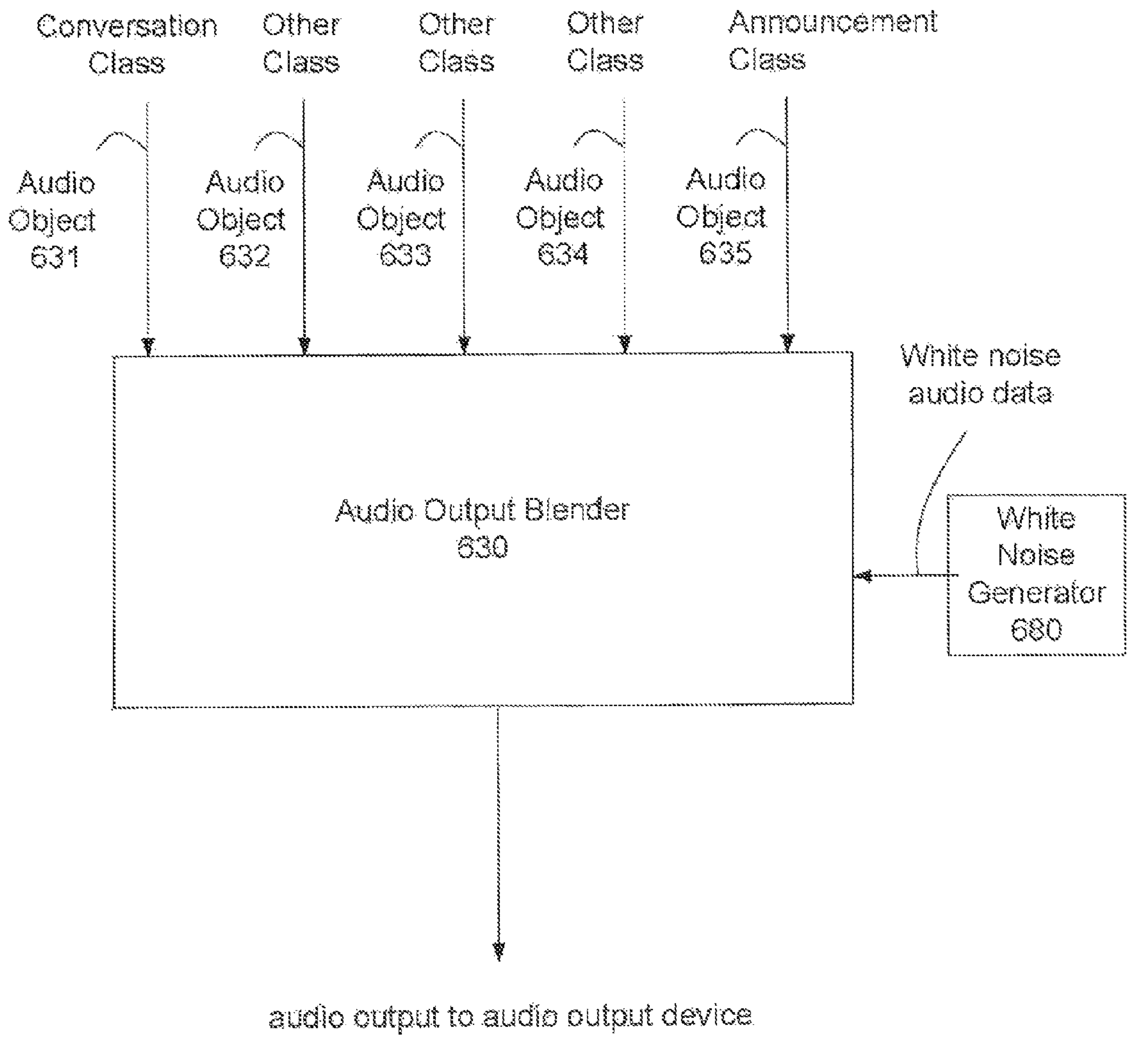
FIG. 6 illustrates a block diagram of a system for combining the sound of multiple audio objects into one audio output when one of the audio objects is classified as announcement class.

FIG. 6 illustrates a block diagram of combining a plurality of audio objects into one audio output when one of the audio objects is classified as announcement class.

Audio object 631 is classified as conversation class; audio object 632, audio object 633, and audio object 634 all are classified as other class; audio object 635 is classified as announcement class. In one embodiment, audio output blender 630 allocates 100% of the total 80 dB amplitude to the audio object classified as announcement class. Audio output blender 630 attenuates the amplitude of the audio object content in audio object 631, audio object 632, audio object 633 and audio object 634 to 0 dB. Audio output blender 630 boosts the amplitude of the audio object content in audio object 635 to 80 dB.

Other Audio Object Class

In one embodiment, the audio object class further includes music class and speech class. An audio object with music class contains music audio data. An audio object with speech class contains recorded speech audio data.

Figure 7:
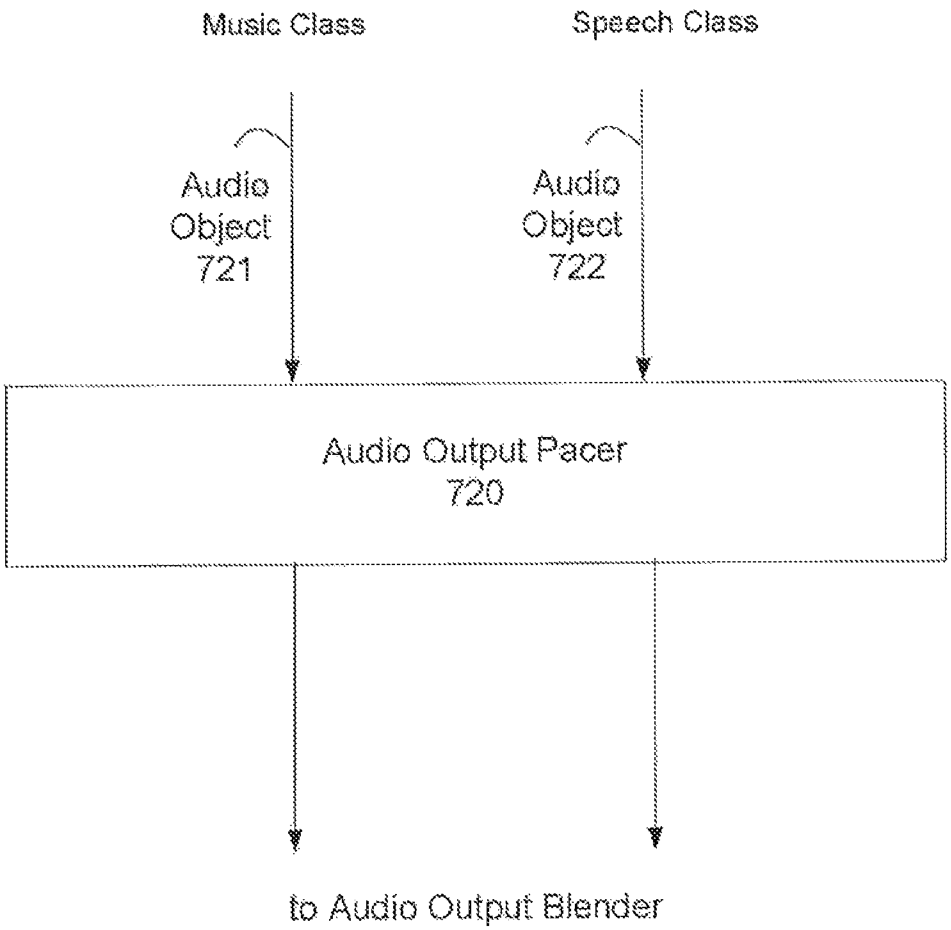
FIG. 7 illustrates a block diagram of a system for adjusting the sound of audio objects classified as music class and audio object classified as speech class.

FIG. 7 illustrates a block diagram of processing audio objects classified as music class and audio object classified as speech class. Audio output pacer 720 filters out frequencies outside of human speech from an audio object classified as speech class in order to enhance the speech clarity. Audio output pacer 720 retains the spectrum of frequencies in an audio object classified as music class. Audio object 721 is classified as music class; audio object 722 is classified as speech class. In one embodiment, audio output pacer 720 filters out frequencies higher than 4 KHz from the audio object content in audio object 722.

Processing Audio Objects Based on the Dynamic Properties

Figure 8:
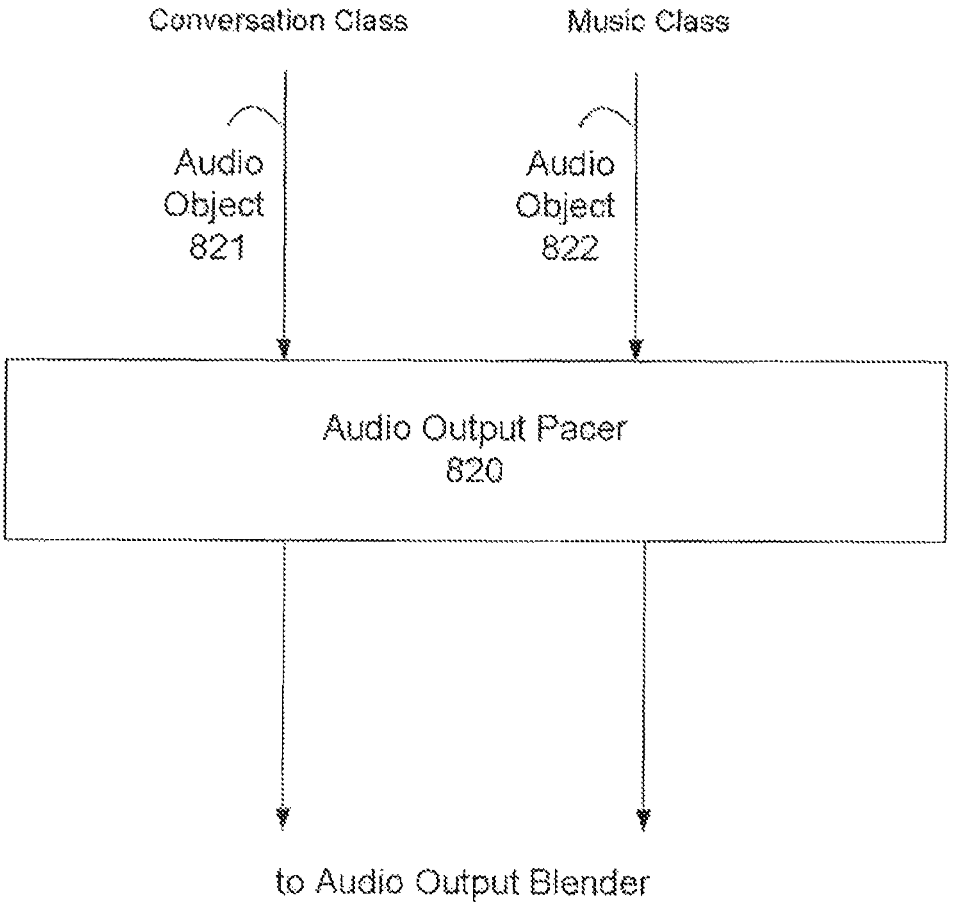
FIG. 8 illustrates a block diagram of a system for adjusting the sound of audio objects based on the dynamic properties of the audio objects.

FIG. 8 illustrates a block diagram of processing audio objects based on the dynamic properties of the audio objects. As used herein, dynamic property of an audio object refers to the amplitude and frequency of the audio object content at the time of processing. Audio output pacer 820 modifies an audio object based on the dynamic property of the audio object in order to overcome rapid and uncomfortable changes in amplitude and frequencies.

Audio object 821 is classified as conversation class and audio object 822 is classified as music class. In one embodiment, audio output pacer 820 detects that the white noise level of the audio object content in audio object 821 is higher than 40 dB. Audio output pacer 820 filters out the white noise from the audio object content in audio object 821. In another embodiment, audio output pacer 820 detects that the amplitude of the audio object content in audio object 822 exceeds 60 dB. Audio output pacer 820 attenuates the amplitude of the audio object content in audio object 822 to 35 dB or some other predetermined comfort level.

Processing Audio Objects Based on the Dynamic Properties of Other Audio Objects

Figure 9:
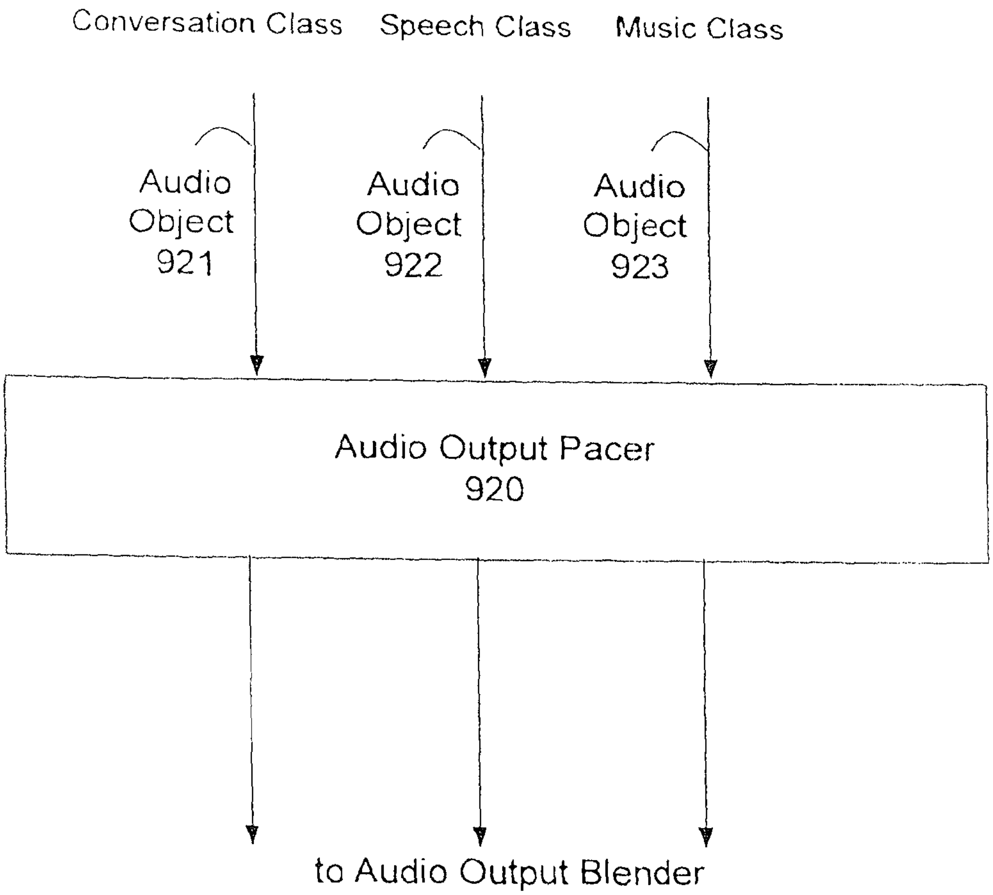
FIG. 9 illustrates a block diagram of a system for adjusting the sound of audio objects based on the dynamic properties of other audio objects.

FIG. 9 illustrates a block diagram of processing an audio object based on the dynamic properties of other audio objects. Audio output pacer 920 modifies an audio object based on the dynamic properties of other audio objects in order to provide a smooth and pleasant transition.

Audio object 921 is classified as conversation class, audio object 922 is classified as speech class and audio object 923 is classified as music class. In one embodiment, audio object Pacer 920 can detect that the amplitude of the audio object content in audio object 921 has been at lower than 10 dB for the past 5 seconds, indicating a silent period. In one embodiment, audio output pacer 920 can respond to silent periods by gradually increasing the amplitude of the audio object content in audio object 922 to 60 dB or some other comfortable level. In one embodiment, audio output pacer 920 can respond to silent periods by increasing the amplitude of the audio object content in audio object 922 gradually to 60 dB over 4 seconds. In another embodiment, audio output pacer 920 increases the amplitude of the audio object content in audio object 922 gradually to 60 dB over 15 seconds. In one embodiment, audio output pacer 920 does not change the amplitude of the audio object content in audio object 923.

In one embodiment, audio output pacer 920 can detect that the amplitude of the audio object contained in audio object 921 has increased; for example, from 10 dB to 40 dB, in the past 100 milliseconds or some other predetermined period of time. Audio output pacer 920 can attenuate the increased amplitude of the audio object content in audio object 922 back to some lower level. In one embodiment, audio output pacer 920 attenuates the amplitude gradually to the original level in the next 5 seconds. In another embodiment, audio output pacer 920 attenuates the amplitude back to the original level immediately. In one embodiment, audio output pacer 920 does not change the amplitude of the audio object content in audio object 923.

Audio Output Mixer Revisited

In one embodiment, audio output mixer includes a datastore. In one embodiment, the datastore stores user preferences. Audio output mixer processes audio objects based on user preferences. In one embodiment, user preferences indicate to turn off background music. Audio output mixer attenuates the amplitude of audio object with music class to 0 dB. In another embodiment, the user preferences indicate to turn the volume for conversation to maximum. Audio output mixer boosts the amplitude of audio object with conversation class to 90 dB or some other predetermined maximum level.

In one embodiment, audio output mixer includes the capability to receive instructions from a user. Audio output mixer processes the plurality of audio object accordingly.

In one embodiment, audio output mixer includes the capability to receive instructions from the other party of a conversation, and can determine how to process the audio objects based on instructions from the other party. In one embodiment, an instruction indicates to give preferential treatment to audio object classified as speech class. Audio output mixer boosts the amplitude of the audio object with speech class to 65 dB, and lowers the amplitude of other audio object to 35 dB. In one embodiment, audio output mixer receives instructions at setup time of the conversation. In another embodiment, audio output mixer receives instructions during the conversation. In yet another embodiment, audio output mixer receives instructions both at setup time of the conversation and during the conversation.

A Phone for Receiving Multiple Audio Data

In one embodiment, a phone that can receive and process multiple audio data objects during a phone call includes an audio output mixer. A user uses the phone to establish a phone call with another party. The phone processes the multiple audio data into corresponding audio objects. One of the audio objects contains the phone conversation. The audio output mixer processes the plurality of audio objects into a single audio output to conform to the hearing constraints, and to enhance the overall listening experience for the user as described herein. Audio output mixer sends the single audio output to the phone's audio output device.

Other Audio Devices that Receives Multiple Audio Data

In one embodiment, a headset with the capability of receiving and processing multiple audio data includes an audio output mixer. In one embodiment, the audio output mixer can process audio objects representing sounds from the environment. Audio output mixer can monitor the amplitude of the audio object. In one embodiment, audio output mixer can detect that the amplitude is below some threshold, in which case, audio output mixer attenuates that audio object to 0 dB. In one embodiment, audio output mixer can detect that the amplitude is above a threshold, in response audio output mixer can attenuate the amplitude of the audio object to a comfortable listening level for the headset user, and can attenuate all other audio object to 0 dB. In one embodiment, the threshold is 100 dB. In another embodiment, the threshold is 85 dB. In one embodiment, the comfortable listening level is 14 dB. In another embodiment, the comfortable listening level is 16 dB.

In another embodiment, audio output mixer can monitor for certain audio patterns in the audio object representing sounds from the environment for safety sakes. In many everyday situations it can be dangerous for a person to be completely blocked off from the sounds of everyday life and their environment. Everyday people are alerted to possible danger and potential hazards by both intended and unintended environmental sounds. Fire engines alert motorists and pedestrians alike to get out of the way of a speeding truck while screams, cries and other sounds can alert people of trouble or distress. Of the many forms of alarms and alerts it is necessary to stay aware of, any and all of them can be detected by listening to the distinct audio patterns of such sounds including, but not limited to, sirens, alarms, traffic noise, and cries for help. In one embodiment, if audio output mixer does not detect select environmental audio patterns, then audio output mixer can attenuate environmental audio objects to 0 dB. If audio output mixer does detect environmental audio patterns, then audio output mixer can attenuate the amplitude of the environmental audio objects to a comfortable listening level for the headset user, and can attenuate all other audio object to 0 dB. In one embodiment, environmental audio pattern represents a roaring train, a barking dog, an emergency siren, a ringing phone, or screeching tires. A user using the headset to listen to music, radio or a phone call will be able to hear the sounds from the environment under the aforementioned conditions.

In one embodiment, there are other audio devices that receive and process multiple audio data. In one embodiment, the audio device includes an audio output mixer in order to enhance the device user's listening experience. The processing of audio object depends on the specific functionalities of the audio device. Those skilled in the art should be able to apply the illustrations to tailor the processing of audio object accordingly.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. An audio system for a wireless telephone, comprising:

a first component classifying each audio object of a plurality of audio objects to be of a class that is ranked relative to at least two other classes based on a content type of the each audio object to generate a first audio object;

an audio output mixer monitoring audio representing sounds from an environment to generate a second audio object;

an audio output pacer within the wireless telephone, wherein the audio output pacer receives the plurality of audio objects, the plurality of audio objects comprising the first audio object representing incoming audio data of a telephone call, and the second audio object representing detected local environmental distress audio data, and wherein the audio output pacer attenuates the first audio object, and to set sound associated with the second audio object to a comfortable listening level the audio output pacer attenuates the second audio object; and an audio output blender within the wireless telephone, wherein the audio object blender receives from the audio output pacer modified sounds of the plurality of audio objects, allocates a percentage of a total amplitude of the system to the first audio object depending on its class type, combines the modified sounds of the plurality of audio objects into an audio output, and sends the audio output to an audio output device coupled to the wireless telephone for rendering at the wireless telephone.

2. The system of claim 1, wherein the audio output device is one of: a headset, headphones, and at least one speaker.

3. The system of claim 1, wherein the class is one of: an announcement class, a conversation class, a music class, and an other class.

4. The system of claim 3, wherein the announcement class is ranked higher than the conversation class which is ranked higher than the music class which is ranked higher than the other class.

5. The system of claim 4, wherein one or more objects of the plurality of objects that are of a higher rank class than a respective class of one or more other objects are set at a higher amplitude relative to the other objects to give priority to content classified as speech type content over other types of content, and wherein the speech type content is rendered by the audio output pacer to be at an optimal output sound level and the other type content is rendered at a background sound level.

6. The system of claim 1, wherein the distress audio data is one of: a siren, an alarm, a scream, a cry for help, a barking dog, and a screeching tire.

7. The system of claim 1 further comprising a white noise generator coupled to the audio blender and adding white noise at a defined amplitude to the audio output.

8. The system of claim 7, further comprising detecting a level of white noise in the first audio object and filtering out the white noise from the first audio object.

9. The system of claim 1, further comprising detecting a period of silence associated with the first audio object and increasing or decreasing the amplitude of the first audio object depending on a length of time of the period of silence.

10. The system of claim 1, further comprising analyzing a frequency pattern of each object of the plurality of objects to derive the class of the each object and encoding the class as an audio object attribute associated with the each object.

11. A method of adjusting sounds in a wireless telephone, comprising:

classifying each audio object of a plurality of audio objects to be of a class that is ranked relative to at least two other classes based on a content type of the each audio object to generate a first audio object;

monitoring audio representing sounds from an environment to generate a second audio object;

receiving within the wireless telephone the plurality of audio objects, the plurality of audio objects comprising the first audio object representing incoming audio data of a telephone call, and the second audio object representing detected local environmental distress audio data, wherein the first audio object is attenuated, and to set sound associated with the second audio object to a comfortable listening level the second audio object is attenuated;

receiving within the wireless telephone modified sounds of the plurality of audio objects;

allocating a percentage of a total amplitude of the system to the first audio object depending on its class type;

combining within the wireless telephone the modified sounds of the plurality of audio objects into an audio output; and sending the audio output to an audio output device coupled to the wireless telephone for rendering at the wireless telephone.

12. The method of claim 11, wherein the audio output device is one of: a headset, headphones, and at least one speaker.

13. The method of claim 11, wherein the class is one of: an announcement class, a conversation class, a music class, and an other class.

14. The method of claim 13, wherein the announcement class is ranked higher than the conversation class which is ranked higher than the music class which is ranked higher than the other class.

15. The method of claim 14, wherein one or more objects of the plurality of objects that are of a higher rank class than a respective class of one or more other objects are set at a higher amplitude relative to the other objects to give priority to content classified as speech type content over other types of content, and wherein the speech type content is rendered by the audio output pacer to be at an optimal output sound level and the other type content is rendered at a background sound level.

16. The method of claim 11, wherein the distress audio data is one of: a siren, an alarm, a scream, a cry for help, a barking dog, and a screeching tire.

17. The method of claim 11, further comprising a white noise generator coupled to the audio blender and adding white noise at a defined amplitude to the audio output.

18. The method of claim 17, further comprising detecting a level of white noise in the first audio object and filtering out the white noise from the first audio object.

19. The method of claim 11, further comprising detecting a period of silence associated with the first audio object and increasing or decreasing the amplitude of the first audio object depending on a length of time of the period of silence.

20. The method of claim 11, further comprising analyzing a frequency pattern of each object of the plurality of objects to derive the class of the each object and encoding the class as an audio object attribute associated with the each object.

21. A non-transitory computer program product comprising a computer useable non-transitory medium having a computer readable program, wherein the computer readable program when executed on a computer causes the computer to:

classify each audio object of a plurality of audio objects to be of a class that is ranked relative to at least two other classes based on a content type of the each audio object;

monitor audio representing sounds from an environment to generate a second audio object;

receive within a wireless telephone the plurality of audio objects, the plurality of audio objects comprising the first audio object representing incoming audio data of a telephone call, and the second audio object representing detected local environmental distress audio data, wherein the first audio object is attenuated, and to set sound associated with the second audio object to a comfortable listening level the second audio object is attenuated;

receive within the wireless telephone modified sounds of the plurality of audio objects;

allocate a percentage of a total amplitude of the system to the first audio object depending on its class type;

combine within the wireless telephone the modified sounds of the plurality of audio objects into an audio output; and send the audio output to an audio output device coupled to the wireless telephone for rendering at the wireless telephone.

22. The product of claim 21, wherein the audio output device is one of: a headset, headphones, and at least one speaker.

23. The product of claim 21, wherein the class is one of: an announcement class, a conversation class, a music class, and an other class.

24. The product of claim 21, wherein the announcement class is ranked higher than the conversation class which is ranked higher than the music class which is ranked higher than the other class.

25. The product of claim 21, wherein the distress audio data is one of: a siren, an alarm, a scream, a cry for help, a barking dog, and a screeching tire.

26. The product of claim 21, wherein the computer readable program further comprises code to generate white noise to be added at a defined amplitude to the audio output.

27. The product of claim 26, wherein the computer readable program further comprises code to detect a level of white noise in the first audio object and filter out the white noise from the first audio object.

28. The product of claim 21, wherein the computer readable program further comprises code to detect a period of silence associated with the first audio object and increase or decrease the amplitude of the first audio object depending on a length of time of the period of silence.

29. The product of claim 21, wherein one or more objects of the plurality of objects that are of a higher rank class than a respective class of one or more other objects are set at a higher amplitude relative to the other objects to give priority to content classified as speech type content over other types of content, and wherein the speech type content is rendered by the audio output pacer to be at an optimal output sound level and the other type content is rendered at a background sound level.

30. The product of claim 21, wherein the computer readable program further comprises code to analyze a frequency pattern of each object of the plurality of objects to derive the class of the each object and encoding the class as an audio object attribute associated with the each object.

* * * * *